United States Patent

[11] 3,567,092

[72] Inventors Hans Heinin
Munich;
Erich Filsinger, Unterhaching; Wolfgang
Geisslinger; Heldemar Radl, Munich,
Germany
[21] Appl. No. 830,593
[22] Filed June 5, 1969
[45] Patented Mar. 2, 1971
[73] Assignee Agfa-Gevaert Aktiengesellschaft
Leverkusen, Germany
[32] Priority June 7, 1968
[33] Germany
[31] 1,772,602

[54] CINEMATOGRAPHIC APPARATUS
22 Claims, 3 Drawing Figs.
[52] U.S. Cl. ..................................................... 226/66,
226/70
[51] Int. Cl. ..................................................... G03b 1/22
[50] Field of Search ........................................... 226/70, 64,
65, 66; 352/8, 14 (B), 14 (BA), 14 (DL)

[56] References Cited
UNITED STATES PATENTS
2,015,528  9/1935  Larson ........................ 226/70

2,335,435  11/1943  Morgan et al. ................ 226/65
2,374,318  4/1945  Wurger ........................ 226/65

Primary Examiner—Allen N. Knowles
Attorney—Michael S. Striker

ABSTRACT: A mechanism for actuating the pulldown in a motion picture projector wherein the pulldown is movable in parallelism with the film path by a rotary radial cam and at right angles to the film path by a rotary axial cam tiltable about an axis which is normal to and intersects the common axis of the two cams to thereby effect stepwise forward or rearward transport of motion picture film. Such tilting is caused by axial movements of a sleeve which surrounds the common drive shaft of the cams and is coupled to the axial cam by a pin-and-slot connection. The sleeve is movable axially in opposite directions by a lever which is coupled to the cores of two electromagnets each of which is energizable independently of the other. A centering lever automatically returns the sleeve and the axial cam to a neutral position when the two electromagnets are deenergized whereby the axial cam is disengaged from the pulldown to permit rapid rewinding of film or prolonged projection of the image of a selected film frame.

INVENTOR.
HANS HEINEN
ERICH FILSINGER
WOLFGANG GEISSLINGER
HELDEMAR RADL

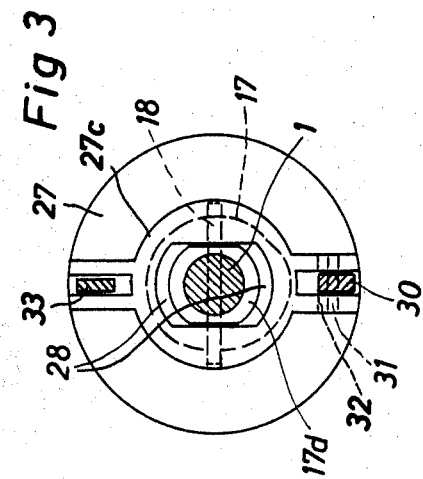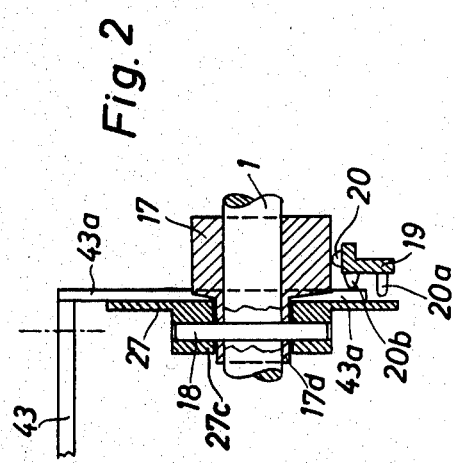

CINEMATOGRAPHIC APPARATUS

BACKGROUND OF THE INVENTION

The present invention relates to cinematographic apparatus in general, particularly to motion picture projectors. Still more particularly, the invention relates to improvements in mechanisms which effect movements of the claw pulldown in a motion picture projector to cause stepwise forward or rearward transport of motion picture film.

SUMMARY OF THE INVENTION

An object of our invention is to provide a simple, rugged, reliable and compact mechanism which effects movement of the claw pulldown in a cinematographic apparatus, particularly in a motion picture projector.

Another object of the invention is to provide a mechanism whose inertia is low, which is subjected to negligible wear when put to actual use, and which can be manipulated in a simple way to effect forward or rearward transport of the film or to effect temporary or longer lasting disengagement of claw pulldown from the film.

A further object of the invention is to provide a mechanism which can operate the claw pulldown with a high degree of accuracy to avoid damage to motion picture film and wherein a single drive member suffices to move the claw pulldown during transport of motion picture film in forward or rearward direction.

The invention is embodied in a cinematographic apparatus, particularly in a motion picture projector, which comprises guide means defining a path for a length of perforated film, a pulldown comprising a film engaging claw movable in a first direction in parallelism with and in a second direction toward and away from the film path, first rotary cam means cooperating with the pulldown to effect movements of the claw in the first direction, and second rotary cam means cooperating with the pulldown to effect movements of the claw in the second direction. In accordance with a feature of the invention, the first cam means is a radial cam and the second cam means is an axial cam which is coaxial with the radial cam and is tiltable about an axis which is normal to and intersects the common axis of the two cams. Such tilting of the axial cam is utilized to effect stepwise forward or rearward transport of the film and can be caused by a sleevelike control member which surrounds the common drive shaft of the two cams and is movable in first and second directions in response to selective energization of two electromagnets. The radial cam is preferably provided with adjustable means for determining two end positions of the axial cam.

The novel features which are considered as characteristic of the invention are set forth in particular in the appended claims. The improved cinematographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a fragmentary sectional view as seen in the direction of arrows from the line II—II of FIG. 1; and FIG. 3 is a fragmentary sectional view as seen in the direction of arrows from the line III—III of FIG. 1.

DESCRIPTION OF THE PREFERRED EMBODIMENTS

Figure 1:
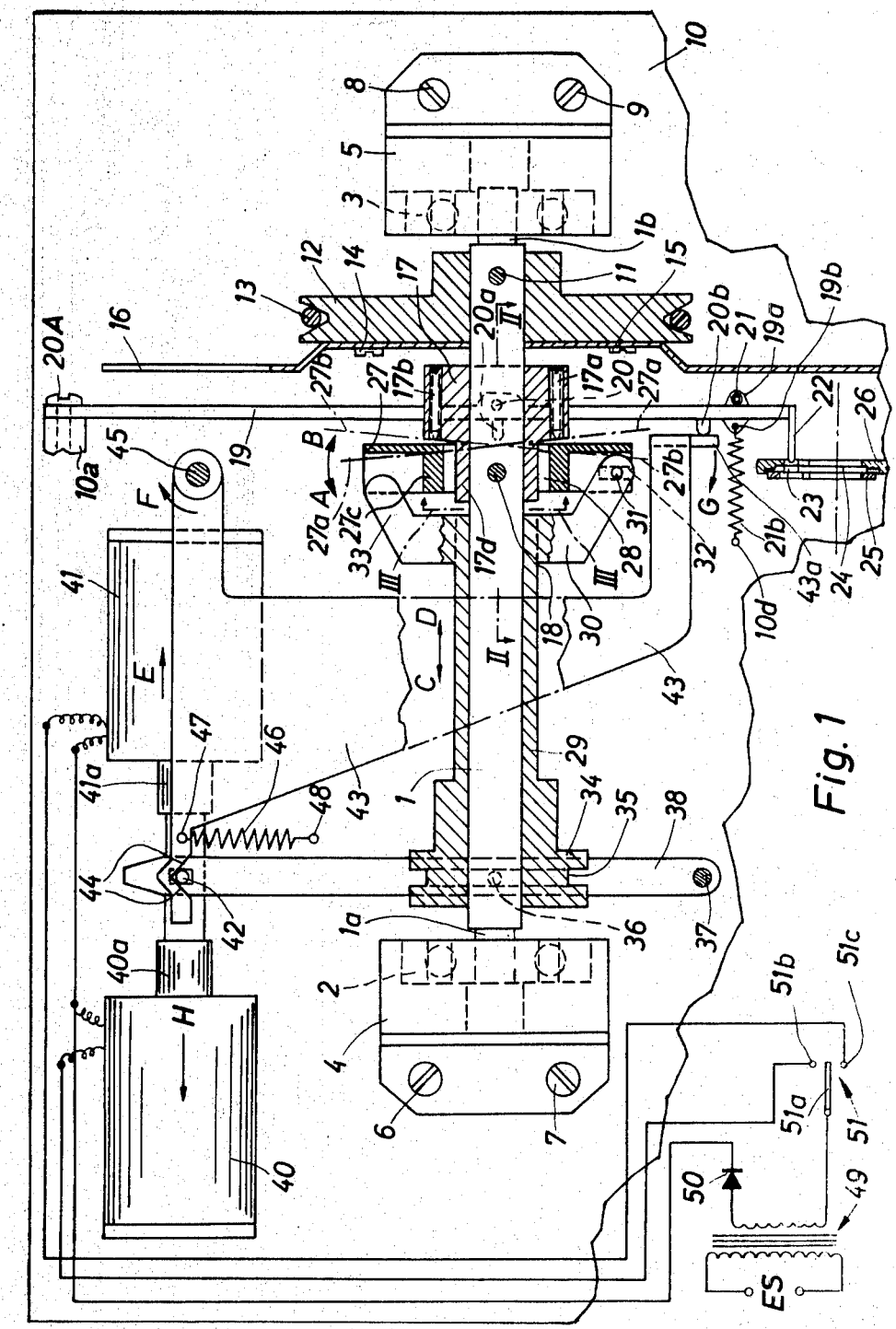
FIG. 1 is a fragmentary horizontal sectional view of a cinematographic apparatus which embodies the invention.

Referring to FIG. 1, there is shown a portion of a motion picture projector which comprises a housing including a platelike support 10. The housing accommodates a prime mover (not shown), preferably an electric motor, which rotates a horizontal main drive shaft 1 through the intermediary of a pulley 12 and an endless belt 13. The pulley 12 is affixed to the shaft 1 by a transversely extending pin 11 or an analogous fastener. The end portions 1a, 1b of the shaft 1 are rotatable in antifriction ball bearings 2, 3 which are respectively mounted in brackets 4, 5. These brackets are respectively secured to the support 10 by screws 6, 7 and 8, 9. In addition to transmitting torque to the main drive shaft 1, the pulley 12 further serves to directly support and drive a disc-shaped shutter 16 which is secured thereto by screws 14, 15.

The main drive shaft 1 serves to support and to rotate a radial cam 17 having a hub 17d which is secured to the shaft by a diametrically extending pin 18. The radial cam 17 serves to effect recurrent movements of a claw pulldown 19 here shown as a one-armed lever one end of which is pivotally secured to a boss 10a of the support 10 by means of a screw 20A. The lower part of the pulldown 19 (as seen in FIG. 1) has a lug 19a for one end of a helical spring 21 which is anchored in the housing of the motion picture projector and serves to maintain a first follower 20 of the pulldown 19 in abutment with the peripheral surface of the radial cam 17. The axis of the spring 21 extends at right angles to the plane of FIG. 1, i.e., the spring tends to pull the lug 19a in a direction toward the observer.

The pulldown 19 has a film engaging portion or claw 22 which can extend into perforations 23 provided in a motion picture film 24. The film 24 is thereby caused by the claw 22 to advance stepwise in a direction at right angles to the plane of FIG. 1. As shown, the film 24 is biased by a pressure plate 25 to remain in the path defined by the channel of a guide 26. The radial cam 17 serves as a means for imparting to the claw 22 movements in a direction at right angles to the plane of FIG. 1, i.e., in parallelism with the film path, so that the claw can transport the film 24 forwardly or rearwardly, depending upon whether the claw extends into a perforation 23 while it moves toward or away from the observer of FIG. 1. A second cam 27, here shown as a tiltable axial cam, has a flat end face which serves to move the claw 22 toward and away from the path for the film 24 to thereby advance the tip of the claw into or out of the adjoining perforation 23. The directions in which the axial cam 27 can be tilted with reference to the main drive shaft 1 are indicated by a double-headed arrow A–B. This axial cam 27 is tiltable on the aforementioned pin 18 which extends diametrically of the shaft 1 and also serves to insure that the hub 17d of the radial cam 17 shares all angular movements of the drive shaft. It will be seen that the cam 27 is tiltable about an axis which intersects and makes a right angle with the axis of the main drive shaft 1, i.e., with the common axis of the cams 17, 27. The end positions of the cam 27 are indicated by phantom lines, as at 27a and 27b. The means for selecting and fixing such end positions of the axial cam 27 comprises two adjustable screws 17a, 17b which are received in tapped axially parallel bores of the radial cam 17. The flat right-hand end face of the cam 27 is tracked by a second follower 20a of the pulldown 19. The clearance 28 between the periphery of the hub 17d and the internal surface of the axial cam 27 is dimensioned in such a way that the cam 27 is tiltable between the end positions 27a, 27b without any interference on the part of the cam 17. The cam 27 has a hub 27c which surrounds, with aforementioned clearance 28, the hub 17d of the cam 17.

The means for tilting the axial cam 27 from the end position 27a to the end position 27b or vice versa comprises a rotary tubular control member 29 which is a sleeve surrounding the shaft 1 between the hub 17d and the end portion 1a and reciprocable in directions indicated by the double-headed arrow C–D. The right-hand end portion of the sleeve 29 is provided with an extension or arm 30 the free end of which is connected with a pin 31 crossing in space and extending at right angles to the axis of the drive shaft 1. The pin 31 is parallel to the pivot pin 18 for the axial cam 27 and extends into a radial slot 32 of the cam 27. The slot 32 is spaced from and parallel to the flat right-hand end face of the axial cam 27. In order to properly balance the sleeve 29, the latter comprises a second extension or arm 33 which is mirror symmetrical to the arm 30 with reference to a plane including the axis of the shaft 1 and normal to the plane of FIG. 1.

The means for moving the sleeve 29 axially to thereby move the cam 27 to the end position 27a, to the end position 27b, or to the illustrated neutral or idle position comprises a disc or wheel 34 which is rigid or integral with the left-hand axial end of the sleeve 29 and has an endless circumferential groove 35 for a wiper 36 which is provided on the intermediate portion of a shifting or motion transmitting lever 38. The latter is pivotable on a pin 37 which is secured to the support 10 and its upper end portion is provided with a coupling stud 42 which connects it to the reciprocable cores 40a, 41a of two electromagnets here shown as solenoids 40, 41. The arrangement for selectively energizing the electromagnets 40, 41 comprises an energy source ES connected to the primary winding of a transformer 49 whose secondary winding is connected with the movable median contact 51b of a two-way switch 51 and to a rectifier 50. The latter is connected with one pole of the electromagnet 40 and with one pole of the electromagnet 41. The other poles of the electromagnets 40, 41 are respectively connected with the fixed contacts 51b, 51c of the switch 51. The contacts 51b, 51c flank the contact 51a. It will be readily understood that the electromagnet 40 is energized in response to movement of the median contact 51a into engagement with the contact 51b and that the electromagnet 41 is energized in response to movement of median contact 51a into engagement with the fixed contact 51c. When the movable contact 51a assumes the illustrated neutral position, the electromagnets 40, 41 are deenergized and the axial cam 27 automatically assumes the illustrated neutral or idle position midway between the end positions 27a, 27b. The device for maintaining the cam 27 in neutral position includes the aforementioned coupling stud 42 which cooperates with an arresting or centering member 43. The member 43 is a lever which is pivotable on a pin 45 affixed to the support 10 and which is provided with a V-shaped notch 44 for the stud 42. A helical spring 46 is connected to a post 47 on the centering member 43 and to a post 48 on the support 10; its function is to bias the notched portion of the member 43 against the stud 42 on the shifting lever 38. An extension or arm 43a of the centering member abuts against a third follower 20b of the pulldown 19 when the stud 42 is free to enter the notch 44. The tip of the claw 22 is then disengaged from the film 24. This reduces the wear on the cam 27 and follower 20b because the latter is disengaged from the cam 27 when the shaft 1 rotates in neutral position of the sleeve 29.

The pulldown 19 has a second lug 19b which is coupled to one end of a helical spring 21b. The other end of this spring is attached to a post 10d on the support 10. The purpose of the spring 21b is to bias the follower 20a against the flat right-hand end face of the axial cam 27 or to bias the follower 20b against the arm 43a of the centering member 43.

FIG. 2 illustrates the positions of the followers 20, 20a and 20b on the pulldown 19 with reference to each other. This illustration further shows that the hub 27c is mounted in such a way that the cam 27 has little freedom of movement in axial direction of the pivot pin 18.

FIG. 3 shows the clearance 28, the outline of the peripheral surface on the radial cam 17 and the two-piece slot 32 for the pin 31 on the arm 30 of the sleeve 29. The arm 30 extends into a bifurcated portion of the axial cam 27.

THE OPERATION

FIG. 1 shows the axial cam 27 in neutral or idle position in which its flat right-hand end face is located in a plane extending at right angles to the axis of the main drive shaft 1. The cam 27 assumes such neutral position in response to deenergization of the electromagnets 40 and 41, i.e., in response to movement of median contact 51a of the switch 51 to the illustrated neutral position. The spring 46 is then free to pull the centering member 43 in a counterclockwise direction, as viewed in FIG. 1, and to cause the notch 44 to accommodate the stud 42 of the shifting lever 38. The arm 43a of the centering member 43 engages the follower 20b which is biased thereagainst by the spring 21b. The follower 20a is then automatically disengaged from the flat right-hand end face of the axial cam 27 but the follower 20 remains in engagement with the peripheral surface of the radial cam 17. Since the shifting lever 38 is held in the illustrated neutral position by the stud 42 which extends into the notch 44, the wiper 36 holds the sleeve 29 in such axial position which corresponds to neutral position of the axial cam 27. As explained above, the cam 27 is tiltable on the pin 18 in response to movement of the pin 31 with reference to the slot 32. In the neutral position of the cam 27, the arm 43a cooperates with the follower 20b to maintain the claw 22 of the pulldown 19 away from perforations 23 in the film 24. The movement of the cam 27 to neutral position does not interfere with rotation of the main drive shaft 1 which can continue to drive the cams 17, 27 by way of the pin 18. The cam 27 rotates the sleeve 29 and its wheel 34. Such rotation of the shaft 1 in neutral position of the cam 27 causes the cam 17 to move the pulldown 19 and its claw 22 back and forth in parallelism with the plane of the film 24 but the claw 22 cannot enter the perforations 23 so that the film remains at a standstill. This can be utilized to effect a lengthy projection of the image of a selected film frame or to rapidly rewind the film onto its supply reel or spool. This can be effected while the direction and speed of rotation of the main drive shaft 1 remain unchanged.

If the pulldown 19 is to transport the film 24 forwardly or backwards in stepwise fashion, its claw 22 must be free to enter the perforations 23 of the film to advance the film in desired direction in response to movement of the pulldown under the action of the revolving radial cam 17. This is achieved by moving the median contact 51a of the switch 51 into engagement with the fixed contact 51b or 51c to thereby energize one of the electromagnets 40, 41 at a time. For example, if the operator decides to move the median contact 51a into engagement with the fixed contact 51c in order to energize the electromagnet 41, the core 41a moves axially in the direction indicated by arrow E whereby the stud 42 follows such movement and causes the centering member 43 to pivot in a clockwise direction (arrow F). The shifting lever 38 also turns in a clockwise direction about the pin 37 and its wiper 36 shifts the sleeve 29 in the direction indicated by the portion D of the double-headed arrow C–D. The electromagnet 41 is strong enough to overcome the resistance of the spring 46 which tends to maintain the stud 42 in the notch 44. As the centering member 43 turns on the pin 45 in a clockwise direction (arrow F), its arm 43a moves away from the follower 20b so that the spring 21b is free to return the follower 21a into engagement with the flat right-hand end face of the axial cam 27 which then assumes the end position 27a. Thus, the claw 22 of the pulldown 19 can enter a perforation 23 once during each revolution of the cam 27 and for a predetermined interval corresponding to a predetermined portion of the time required by the cam 27 to complete a revolution. The direction in which the sleeve 29 retracts its arm 30 and pin 31 in response to energization of the electromagnet 41 is indicated by the arrow G. This arrow further indicates the direction in which the arm of the centering member 43 moves away from the follower 20b when the electromagnet 41 causes the stud to move to the right, as viewed in FIG. 1. When the cams 17, 27 rotate and the cam 27 assumes the end position 27a, the claw 22 travels along a D-shaped path which includes a section or portion extending in parallelism with the plane of the film 24 (the claw 22 travels along such section under the action of the cam 17 and spring 21) and an arcuate section or portion. While the claw 22 travels along such arcuate section of its D-shaped path, it enters the adjoining perforation 23 at one end of its stroke and transports the film by the length of a frame before it leaves the perforation 23 at the other end of its stroke. The straight section of the path is necessary to return the claw 22 to its initial position. Thus, during travel along its D-shaped path, the claw 22 has a component of movement in parallelism with the direction of film travel (cam 17) and/or a component of movement at right angles to the direction of film travel (cams 17 and 27). For example, energization of the electromagnet 41 (while the main drive shaft 1 rotates the cams 17, 27) can cause the claw 22 to transport the film 24 stepwise in the forward direction.

In order to effect stepwise transport of the film 24 in a rearward direction, the operator moves the median contact 51a of the switch 51 into engagement with the fixed contact 51b. The thus energized electromagnet 40 causes its core 40a to move the stud 42 in a direction to the left, as viewed in FIG. 1 (see the arrow H), whereby the centering member 43 turns first in a counterclockwise direction to assume the neutral position of FIG. 1 and thereupon turns in a clockwise direction while the stud 42 leaves the notch 44 and advances toward the electromagnet 40. Thus, the arm 43a is again moved away from the follower 20b of the pulldown 19. At the same time, the stud 42 causes the shifting lever 38 to move its wiper 36 in a direction to the left and beyond the position of FIG. 1 so that the sleeve 29 is moved in the same direction and its arm 30 and pin 31 cause the axial cam 27 to move to the end position 27b. The direction of axial movement of the sleeve 29 in response to energization of the electromagnet 40 is indicated by the portion C of the double-headed arrow C–D. The resulting movement of the claw 22 in response to rotation of the main drive shaft 1 is out of phase by 180° with reference to its movement when the cam 27 assumes the end position 27a. Consequently the claw 22 enters the adjoining perforation 23 at a time when it begins to advance in a direction to move the film 24 rearwardly. The direction and speed of rotation of the shaft 1 are the same as when the claw 22 transports the film 24 in forward direction. Since the masses which are moved when the sleeve 29 is caused to move with reference to the main drive shaft 1 are small, the inertia of such masses is also small so that the changeover from stepwise transport of film 24 in forward or rearward direction can be effected smoothly and with minimal wear on the parts which are displaced in response to energization of the electromagnet 40 or 41. The same holds true when the movable contact 51a is returned to the illustrated neutral position.

The improved motion picture projector is susceptible of many modifications without departing from the spirit of our invention. For example, the means for biasing the arresting member 43 against the stud 42 may comprise a permanent magnet or an electromagnet. Furthermore, the cam 27 can effect movements of the claw 22 into or out of perforations 23 in film 24 through the intermediary of one or more levers or other suitable motion transmitting parts. Still further, the follower 20 can be disengaged from the peripheral surface of the cam 17 in response to movement of the cam 27 to neutral position to further reduce the wear on the moving parts when the shaft 1 rotates in neutral position of the sleeve 29. The means for rotating the shaft 1 may include a gear train or another transmission which can rotate the shaft at a desired speed. All such modifications will be readily understood upon perusal of the preceding disclosure without necessitating additional illustrations.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

We claim:

1. In a cinematographic apparatus, particularly in a motion picture projector, a combination comprising guide means defining a path for a length of perforated film; a pulldown comprising a film engaging portion movable in a first direction in substantial parallelism with and in a second direction toward and away from said path; first rotary cam means cooperating with said pulldown to effect movements of said film engaging portion in said first direction; and second rotary cam means cooperating with said pulldown to effect movements of said film engaging portion in said second direction, said first and second cam means having a common axis of rotation and one of said cam means being tiltable with reference to the other cam means about a second axis which is at least substantially normal to said common axis to thereby change the direction of film transport along said path.

2. A combination as defined in claim 1, wherein said first cam means includes a radial cam and said second cam means includes an axial cam and constitutes said one cam means, said second axis intersecting said common axis.

3. A combination as defined in claim 2, wherein said axial cam is tiltable between a neutral position and two end positions, and further comprising adjustable means for determining the end positions of said axial cam.

4. A combination as defined in claim 2, wherein said axial cam has a flat end face and wherein said pulldown comprises follower means arranged to track said end face.

5. A combination as defined in claim 2, further comprising drive means defining said common axis and operatively connected with said cams, and control means operative to tilt said axial cam with reference to said drive means and said radial cam.

6. A combination as defined in claim 5, wherein said control means comprises a tubular member surrounding said drive means and reciprocable with reference thereto.

7. A combination as defined in claim 5, wherein said control means is reciprocable in the direction of said common axis and further comprising coupling means connecting said control means with said axial cam.

8. A combination as defined in claim 7, wherein said control means comprises an extension and said coupling means is provided between said extension and said axial cam.

9. A combination as defined in claim 8, wherein said control means is coaxial with and arranged to rotate with said cams and further comprises a second extension which balances said first-mentioned extension during rotation of said control means.

10. A combination as defined in claim 5, wherein said control means comprises a rotary member arranged to rotate with said drive means, coupling means connecting said rotary member with said axial cam, and means for reciprocating said rotary member in the direction of said common axis including shifter means having a portion extending into a circumferential groove provided in said rotary member.

11. A combination as defined in claim 10, further comprising electromagnet means for moving said shifter means to thereby effect axial movements of said rotary member.

12. A combination as defined in claim 11, wherein said electromagnet means comprises a first electromagnet energizable to effect movements of said shifter means in a first direction and a second electromagnet energizable to effect movements of said shifter means in opposite direction.

13. A combination as defined in claim 12, further comprising means for selectively energizing said first and second electromagnets.

14. A combination as defined in claim 13, wherein each of said electromagnets is a solenoid having a reciprocable core operatively connected with said shifter means.

15. A combination as defined in claim 10, wherein said shifter means comprises a lever pivotable about a fixed axis and said portion thereof is a wiper extending into the groove of said rotary member.

16. A combination as defined in claim 10, further comprising centering means operative to maintain said axial cam in a neutral position in which said axial cam is disengaged from said pulldown.

17. A combination as defined in claim 16, wherein said centering means comprises a lever pivotable about a fixed axis, said shifter means having a projection operative to move said axial cam to neutral position by way of said control means.

18. A combination as defined in claim 17, wherein said projection is a stud and said centering means is provided with a notch which receives said stud in neutral position of said axial cam.

19. A combination as defined in claim 16, wherein said centering means comprises a portion which engages said pulldown in neutral position of said axial cam to thereby hold said pulldown away from engagement with said axial cam.

20. A combination as defined in claim 5, further comprising means operative to move said control means between two end positions to thereby tilt said axial cam, movable centering means for moving said control means to a neutral position corresponding to a neutral position of said axial cam in which the latter is disengaged from said pulldown, and means for biasing said centering means to a position corresponding to neutral position of said control means.

21. A combination as defined in claim 20, wherein said biasing means comprises spring means.

22. A combination as defined in claim 20, wherein said biasing means comprises electromagnet means.